United States Patent
Willett et al.

(10) Patent No.: US 9,679,560 B2
(45) Date of Patent: Jun. 13, 2017

(54) SERVER-SIDE ASR ADAPTATION TO SPEAKER, DEVICE AND NOISE CONDITION VIA NON-ASR AUDIO TRANSMISSION

(71) Applicant: Nuance Communications, Inc., Burlington, MA (US)

(72) Inventors: Daniel Willett, Walluf (DE); Jean-Guy E. Dahan, Cote St. Luc (CA); William F. Ganong, III, Brookline, MA (US); Jianxiong Wu, Acton, MA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/770,371

(22) PCT Filed: Feb. 28, 2013

(86) PCT No.: PCT/US2013/028288
§ 371 (c)(1),
(2) Date: Aug. 25, 2015

(87) PCT Pub. No.: WO2014/133525
PCT Pub. Date: Sep. 4, 2014

(65) Prior Publication Data
US 2016/0012819 A1 Jan. 14, 2016

(51) Int. Cl.
*G10L 15/00* (2013.01)
*G10L 15/07* (2013.01)
(Continued)

(52) U.S. Cl.
CPC ............ *G10L 15/075* (2013.01); *G06F 3/167* (2013.01); *G10L 15/14* (2013.01);
(Continued)

(58) Field of Classification Search
CPC ....... G10L 15/30; G10L 15/285; G10L 15/04; G10L 15/08; G10L 15/187; G10L 15/22;
(Continued)

(56) References Cited

U.S. PATENT DOCUMENTS 5,794,189 A 8/1998 Gould
6,167,377 A 12/2000 Gillick et al.
(Continued)

OTHER PUBLICATIONS

May 6, 2013—(WO) International Search Report—App PCT/US2013/028288.

*Primary Examiner* — Charlotte M Baker
(74) *Attorney, Agent, or Firm* — Banner & Witcoff, Ltd.

(57) ABSTRACT

A mobile device is adapted for automatic speech recognition (ASR). A user interface for interaction with a user includes an input microphone for obtaining speech inputs from the user for automatic speech recognition, and an output interface for system output to the user based on ASR results that correspond to the speech input. A local controller obtains a sample of non-ASR audio from the input microphone for ASR-adaptation to channel-specific ASR characteristics, and then provides a representation of the non-ASR audio to a remote ASR server for server-side adaptation to the channel-specific ASR characteristics, and then provides a representation of an unknown ASR speech input from the input microphone to the remote ASR server for determining ASR results corresponding to the unknown ASR speech input, and then provides the system output to the output interface.

20 Claims, 3 Drawing Sheets

(51) Int. Cl.
*G10L 15/20* (2006.01)
*G06F 3/16* (2006.01)
*G10L 15/14* (2006.01)
*G10L 15/18* (2013.01)
*G10L 15/22* (2006.01)
*G10L 25/84* (2013.01)
*G10L 15/30* (2013.01)

(52) U.S. Cl.
CPC .......... *G10L 15/1815* (2013.01); *G10L 15/20* (2013.01); *G10L 15/22* (2013.01); *G10L 25/84* (2013.01); *G10L 15/07* (2013.01); *G10L 15/30* (2013.01); *G10L 2015/223* (2013.01); *G10L 2015/226* (2013.01)

(58) Field of Classification Search
CPC ..... G10L 15/00; G10L 15/063; G10L 15/065; G10L 15/07; G10L 15/075; G10L 15/14; G10L 15/1815; G10L 15/20; G10L 15/265
USPC .... 704/233, 235, E15.043, 246, 251, 255, 9, 704/275, 201, 238, 239, 240, 270, 270.1; 379/406.05, 266.1, 88.01
See application file for complete search history.

(56) References Cited

U.S. PATENT DOCUMENTS

| | | |
|---|---|---|
| 7,024,359 B2 | 4/2006 | Chang et al. |
| 2009/0323925 A1 | 12/2009 | Sweeney et al. |
| 2011/0054899 A1 | 3/2011 | Phillips et al. |
| 2011/0087491 A1 | 4/2011 | Wittenstein et al. |
| 2011/0257974 A1 | 10/2011 | Kristjansson et al. | young
SERVER-SIDE ASR ADAPTATION TO SPEAKER, DEVICE AND NOISE CONDITION VIA NON-ASR AUDIO TRANSMISSION

TECHNICAL FIELD

The invention generally relates to automatic speech recognition (ASR), and more specifically, to client-server ASR on mobile devices.

BACKGROUND ART

An automatic speech recognition (ASR) system determines a semantic meaning of a speech input. Typically, the input speech is processed into a sequence of digital speech feature frames. Each speech feature frame can be thought of as a multi-dimensional vector that represents various characteristics of the speech signal present during a short time window of the speech. For example, the multi-dimensional vector of each speech frame can be derived from cepstral features of the short time Fourier transform spectrum of the speech signal (MFCCs)—the short time power or component of a given frequency band—as well as the corresponding first- and second-order derivatives ("deltas" and "delta-deltas"). In a continuous recognition system, variable numbers of speech frames are organized as "utterances" representing a period of speech followed by a pause, which in real life loosely corresponds to a spoken sentence or phrase.

The ASR system compares the input utterances to find statistical acoustic models that best match the vector sequence characteristics and determines corresponding representative text associated with the acoustic models. More formally, given some input observations A, the probability that some string of words W were spoken is represented as P(W|A), where the ASR system attempts to determine the most likely word string:

$$\hat{W} = \underset{W}{\mathrm{argmax}}\, P(W \mid A)$$

Given a system of statistical acoustic models, this formula can be re-expressed as:

$$\hat{W} = \underset{W}{\mathrm{argmax}}\, P(W)P(A \mid W)$$

where P(A|W) corresponds to the acoustic models and P(W) reflects the prior probability of the word sequence as provided by a statistical language model.

The acoustic models are typically probabilistic state sequence models such as hidden Markov models (HMMs) that model speech sounds using mixtures of probability distribution functions (Gaussians). Acoustic models often represent phonemes in specific contexts, referred to as PELs (Phonetic Elements), e.g. triphones or phonemes with known left and/or right contexts. State sequence models can be scaled up to represent words as connected sequences of acoustically modeled phonemes, and phrases or sentences as connected sequences of words. When the models are organized together as words, phrases, and sentences, additional language-related information is also typically incorporated into the models in the form of a statistical language model.

The words or phrases associated with the best matching model structures are referred to as recognition candidates or hypotheses. A system may produce a single best recognition candidate—the recognition result—or multiple recognition hypotheses in various forms such as an N-best list, a recognition lattice, or a confusion network. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

Recently, ASR technology has advanced enough to have applications that are implemented on the limited footprint of a mobile device. This can involve a somewhat limited stand-alone ASR arrangement on the mobile device, or more extensive capability can be provided in a client-server arrangement where the local mobile device does initial processing of speech inputs, and possibly some local ASR recognition processing, but the main ASR processing is performed at a remote server with greater resources, then the recognition results are returned for use at the mobile device.

U.S. Patent Publication 20110054899 describes a hybrid client-server ASR arrangement for a mobile device in which speech recognition may be performed locally by the device and/or remotely by a remote ASR server depending on one or more criteria such as time, policy, confidence score, network availability, and the like. An example screen shot of the initial prompt interface from one such mobile device ASR application, Dragon Dictation for iPhone, is shown in FIG. 1A which processes unprompted speech inputs and produces representative text output. FIG. 1B shows a screen shot of the recording interface for Dragon Dictation for iPhone. FIG. 1C shows an example screen shot of the results interface produced for the ASR results by Dragon Dictation for iPhone.

One of the challenges of server-side ASR is the requirement of low latency response, even at first use when the ASR engine has no prior knowledge of the speaker, the audio channel and the noise environment. The ASR engine needs to derive noise, channel and speaker characteristics from the incoming signal only once the user starts speaking to the mobile device and the audio is transmitted to the server. And due to latency constraints this can only be implemented in an incremental online approach in order not to introduce unacceptable latency, which strongly limits the options.

This is a particular challenge both at first use and also at later stages of use. Once audio has been collected from the specific device and speaker, only limited information can be drawn from past utterances since noise and channel conditions are subject to change over time and previous usage might have been in a different acoustic environment. In addition, the speaker using the mobile device can not necessarily be assumed to be the same as in a previous utterance.

SUMMARY

Embodiments of the present invention are directed to a mobile device which is adapted for automatic speech recognition (ASR). A user interface for interaction with a user includes an input microphone for obtaining speech inputs from the user for automatic speech recognition, and an output interface for system output to the user based on ASR results that correspond to the speech input. A local controller obtains a sample of non-ASR audio from the input microphone (i.e., audio fetched at the mobile device outside the ASR interaction process) for ASR-adaptation to channel-specific ASR characteristics, and then provides a representation of the non-ASR audio to a remote ASR server for server-side adaptation to the channel-specific ASR characteristics, and then provides a representation of an unknown speech input from the input microphone to the remote ASR server for determining ASR results corresponding to the unknown speech input, and then provides the system output to the output interface.

The non-ASR audio may include audio sampled by the input microphone during a rolling sample window before the unknown speech input. In addition or alternatively, the non-ASR audio may include non-ASR speech audio sampled by the input microphone before the unknown speech input, and the non-ASR speech audio may be limited to speech data sampled from short data windows.

The representation of the non-ASR audio may include pre-processed ASR adaptation data produced by the mobile device from the non-ASR audio, for example, at least one of background noise model data and ASR acoustic model adaptation data. The representation of the non-ASR audio may be limited to speech feature data.

DETAILED DESCRIPTION

Embodiments of the present invention are directed to a mobile device using a client-server ASR arrangement. There is adaptation to channel-specific characteristics by capturing, transmitting and exploiting non-ASR audio (i.e., audio fetched at the mobile device outside the ASR interaction process). This enables the server ASR engine to establish speaker, channel and environment information even before first ASR use, and it allows keeping this information up-to-date. In addition, there various options for handling potential privacy concerns.

It is common practice in server-side ASR to exploit speech data received from a given specific device for recognition performance improvement for future utterances received from the same device. The underlying assumption is that speech data coming from a given specific device is correlated in terms of channel, acoustic environment and speaker. It also is common practice to exploit text data sources available on the mobile device for ASR accuracy improvement. For example, the ASR arrangement only has a reasonable chance of getting correct orthography variants such as Jon or John only when making use of personal contact names as stored on the device. Embodiments of the present invention exploit other channel-specific audio sources by transmitting non-ASR audio data captured by the mobile device outside the pure ASR event, and using this audio data for adaptation of the ASR engine to the specific device, environment and speaker.

Figure 1:
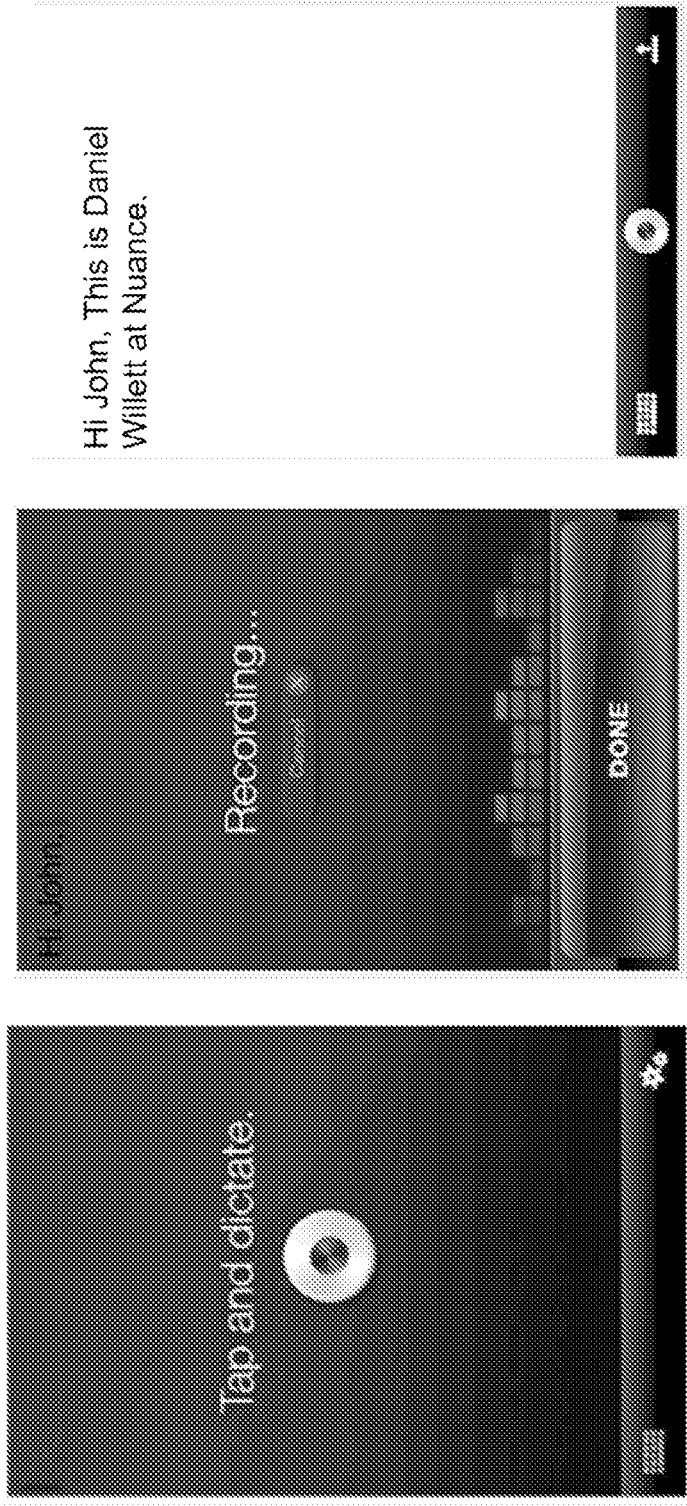
FIG. 1 A-C shows various example screen shots from a hybrid ASR application for a mobile device.
Figure 2:
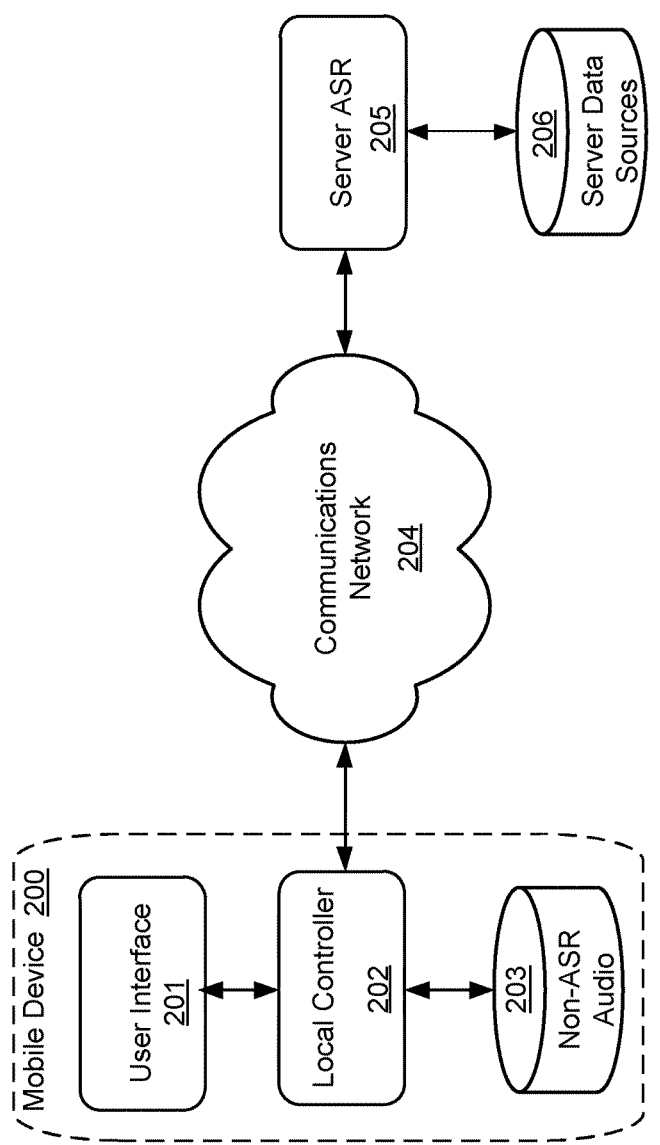
FIG. 2 shows various elements in a hybrid ASR arrangement according to an embodiment of the present invention.

FIG. 2 shows various elements in an ASR arrangement according to an embodiment of the present invention. A user interface 201 on mobile device 200 for interaction with a user includes an input microphone for obtaining speech inputs from the user for automatic speech recognition. A local controller 202 passes representations of unknown speech inputs over a communications network 204 (such as the Internet) to a remote ASR server 205 that uses server data sources 206 to determine ASR results corresponding to the unknown ASR speech input. The ASR results are then sent back over the communications network 204 to the local controller 202 at the mobile device 200 which sends a system output based on the ASR results to the user interface 201 for output to the user. Specifically, the system output at the user interface 201 may be recognition text or audio that corresponds to the speech input and/or a next dialog prompt in an automated dialog process based on the ASR results.

Figure 3:
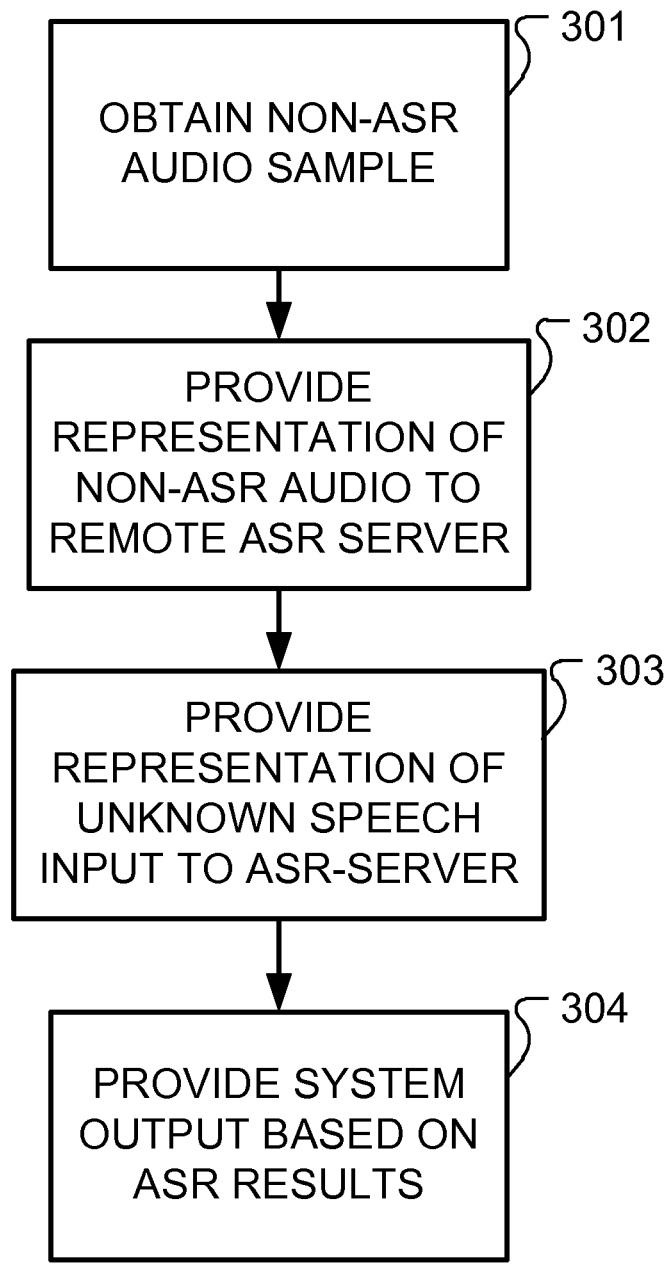
FIG. 3 shows various functional steps in a hybrid ASR arrangement according to an embodiment of the present invention.

FIG. 3 shows various functional steps in an ASR arrangement according to an embodiment of the present invention. The local controller 202 obtains a sample of non-ASR audio, step 301, either directly from the input microphone of the user interface 201 or from non-ASR audio memory 203 on the mobile device 200. The local controller 202 provides a representation of the non-ASR audio to the remote ASR server 205, step 302, for server-side adaptation to the channel-specific ASR characteristics. This allows the system to then operate in conventional ASR, providing representations of unknown ASR speech inputs to the remote ASR server 205, step 303, and then providing the ASR results received from the remote ASR server 205 to the user interface 201 for display to the user, step 304.

In further regard to the non-ASR audio, two general approaches come to mind. In a first approach, the mobile device can capture a few seconds of the audio that is representative for the surrounding noise environment as sensed by the input microphone shortly before the user is expected to use the server-side ASR; for example, by recording a rolling window of audio before the user activates the ASR input. Such pre-ASR audio can be captured when starting up the speech application, which can be assumed representative of the speaker and channel in anticipation of foreground ASR audio to come. A pre-ASR sample of the audio environment can be used to derive a background noise model for de-noising, estimates for device gain settings and signal-to-noise ratio considerations, ASR acoustic model adaptation on the server-side, and decoder parameterization selection. To save on transmission cost, the pre-ASR audio sample need not be transmitted to the server in its entirety. While it could be sent to the ASR server as-is (encoded, with indication of when the button was actually pressed in order to bias any end-pointer and ASR acoustic model toward silence in that section), or it can be pre-processed by the mobile device to derive sufficient audio statistics (e.g., channel mean, channel variance, etc.) so as to reduce processing load and latency at the server-side.

In a different approach, the non-ASR audio can be obtained from sampling audio transmissions by the mobile device in non-ASR speech use cases, such as most prominently when using the mobile device as a telephone for human to human conversation. Audio captured along these lines also can be assumed representative for speaker and channel and exploitation in channel and speaker adaptation is straight-forward. This could trigger ASR speaker adaptation even before a specific user has addressed a first utterance to the server-based ASR service. This would be especially useful for handling the long tail of goat speakers (e.g., strongly accented speech) for whom speaker adapted ASR is often necessary to be useable in any meaningful way.

Capturing audio data for ASR improvement outside the ASR cycle and transmitting it to the ASR server could potentially raise some privacy concerns. This should be less a lesser concern for the first sampling approach above which captures a short audio sample (presumably non-speech). But the concern is more legitimate for the second approach above which captures true speech audio to prepare the ASR server for the specific speaker, device and channel as described above. Such concerns can be alleviated by one or more of:

Sending only adaptation statistics or adapted models or estimated speaker characteristics out from the mobile device rather than audio waveforms as such Sending speech features only out from the mobile device (e.g., mean-normalized MFCCs, bottle-neck features, etc.)

Sample shredding—speech data sampled from short data windows such as one second out of every ten.

Very short data retention on the ASR server—immediately establishing adaptation statistics on the ASR server immediately and then delete without delay.

Embodiments of the invention may be implemented in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

We claim:

1. A mobile device adapted for automatic speech recognition (ASR) and employing at least one hardware implemented computer processor, the mobile device comprising:

an input microphone for obtaining speech inputs from a user for automatic speech recognition;

an output interface for providing a system output to the user; and a local controller configured to:
obtain a sample comprising non-ASR audio from the input microphone,
provide a representation of the non-ASR audio to a remote ASR server for server-side adaptation to channel-specific ASR characteristics,
obtain a sample comprising an unknown ASR speech input from the input microphone,
provide a representation of the unknown ASR speech input to the remote ASR server,
receive, from the remote ASR server, ASR results corresponding to the unknown ASR speech input, and
provide, based on the ASR results corresponding to the unknown ASR speech input, the system output to the output interface.

2. The mobile device according to claim 1, wherein the non-ASR audio comprises audio sampled by the input microphone during a rolling sample window before the unknown ASR speech input.

3. The mobile device according to claim 1, wherein the non-ASR audio comprises non-ASR speech audio sampled by the input microphone before the unknown ASR speech input.

4. The mobile device according to claim 3, wherein the non-ASR speech audio comprises speech data sampled from data windows having a length of one second or less.

5. The mobile device according to claim 1, wherein the representation of the non-ASR audio comprises pre-processed ASR adaptation data produced by the mobile device from the sample comprising non-ASR audio.

6. The mobile device according to claim 5, wherein the ASR adaptation data comprises at least one of:
background noise model data, and
ASR acoustic model adaptation data.

7. The mobile device according to claim 1, wherein the representation of the non-ASR audio is limited to speech feature data.

8. A method comprising:
obtaining, by an input microphone on a mobile device, a sample comprising non-automatic speech recognition (ASR) audio;
transmitting, by the mobile device and to a server, a representation of the non-ASR audio for server-side adaptation to channel-specific ASR characteristics;
receiving, by the input microphone on the mobile device, a sample comprising unknown ASR speech input;
transmitting, by the mobile device and to the server, a representation of the unknown ASR speech input;
receiving, from the server, ASR results corresponding to the unknown ASR speech input; and
outputting, by the mobile device, the ASR results.

9. The method according to claim 8, wherein the non-ASR audio comprises audio sampled by the input microphone during a rolling sample window before the unknown ASR speech input.

10. The method according to claim 8, wherein the non-ASR audio comprises non-ASR speech audio sampled by the input microphone before the unknown ASR speech input.

11. The method according to claim 10, wherein the non-ASR speech audio comprises speech data sampled from data windows having a length of one second or less.

12. The method according to claim 8, wherein the representation of the non-ASR audio comprises pre-processed ASR adaptation data produced by the mobile device from the sample comprising non-ASR audio.

13. The method according to claim 12, wherein the ASR adaptation data comprises at least one of:
background noise model data, and
ASR acoustic model adaptation data.

14. The method according to claim 8, wherein the representation of the non-ASR audio is limited to speech feature data.

15. A non-transitory computer-readable medium having computer-executable program instructions stored thereon that, when executed by a processor, cause the processor to:
obtain, using a microphone, a sample comprising non-automatic speech recognition (ASR) audio;
transmit, to a server, a representation of the non-ASR audio for server-side adaptation to channel-specific ASR characteristics;
obtain, using the microphone, a sample comprising unknown ASR speech input;
transmit, to the server, a representation of the unknown ASR speech input;
receive, from the server, ASR results corresponding to the unknown ASR speech input; and
the ASR results.

16. The non-transitory computer-readable medium according to claim 15, wherein the non-ASR audio comprises audio sampled during a rolling sample window before the unknown ASR speech input.

17. The non-transitory computer-readable medium according to claim 15, wherein the non-ASR audio comprises non-ASR speech audio sampled by the microphone before the unknown ASR speech input.

18. The non-transitory computer-readable medium according to claim 17, wherein the non-ASR speech audio comprises speech data sampled from data windows having a length of one second or less.

19. The non-transitory computer-readable medium according to claim 15, wherein the representation of the non-ASR audio comprises pre-processed ASR adaptation data produced from the sample comprising non-ASR audio.

20. The non-transitory computer-readable medium according to claim 15, wherein the representation of the non-ASR audio is limited to speech feature data.

* * * * *